United States Patent [19]
Alver et al.

[11] 3,756,745
[45] Sept. 4, 1973

[54] COMPOSITE BLADE ROOT CONFIGURATION

[75] Inventors: Alf S. Alver, Wapping; Walter Pilpel, West Hartford, both of Conn.

[73] Assignee: United Aircraft Corporation, East Hartford, Conn.

[22] Filed: Mar. 15, 1972

[21] Appl. No.: 234,743

[52] U.S. Cl................ 416/230, 416/219, 416/241, 416/248
[51] Int. Cl............................................F01d 5/14
[58] Field of Search.................. 416/219, 230, 224, 416/241, 248, 239

[56] References Cited
UNITED STATES PATENTS

| | | | |
|---|---|---|---|
| 3,132,841 | 5/1964 | Wilder | 416/229 X |
| 3,600,103 | 8/1971 | Gray et al. | 416/224 |
| 3,664,764 | 5/1972 | Davies et al. | 416/230 X |
| 3,679,324 | 7/1972 | Stargardter | 416/230 X |
| 3,600,103 | 8/1971 | Gray et al. | 416/224 |
| 3,602,608 | 8/1971 | Morley | 416/224 |
| 3,664,764 | 5/1972 | Davies et al. | 416/230 X |
| 3,679,324 | 7/1972 | Stargardter | 416/230 X |

*Primary Examiner*—Everette A. Powell, Jr.
*Attorney*—Charles A. Warren

[57] ABSTRACT

In a fiber reinforced composite blade, having a root comprising a plurality of tangs, the fibers are brought from the airfoil into the root and arranged within the root to control the relative flexibility of the tangs. With a suitable arrangement of fibers within the root, the operational stresses on the blade can be distributed between the several tangs to best advantage.

8 Claims, 5 Drawing Figures

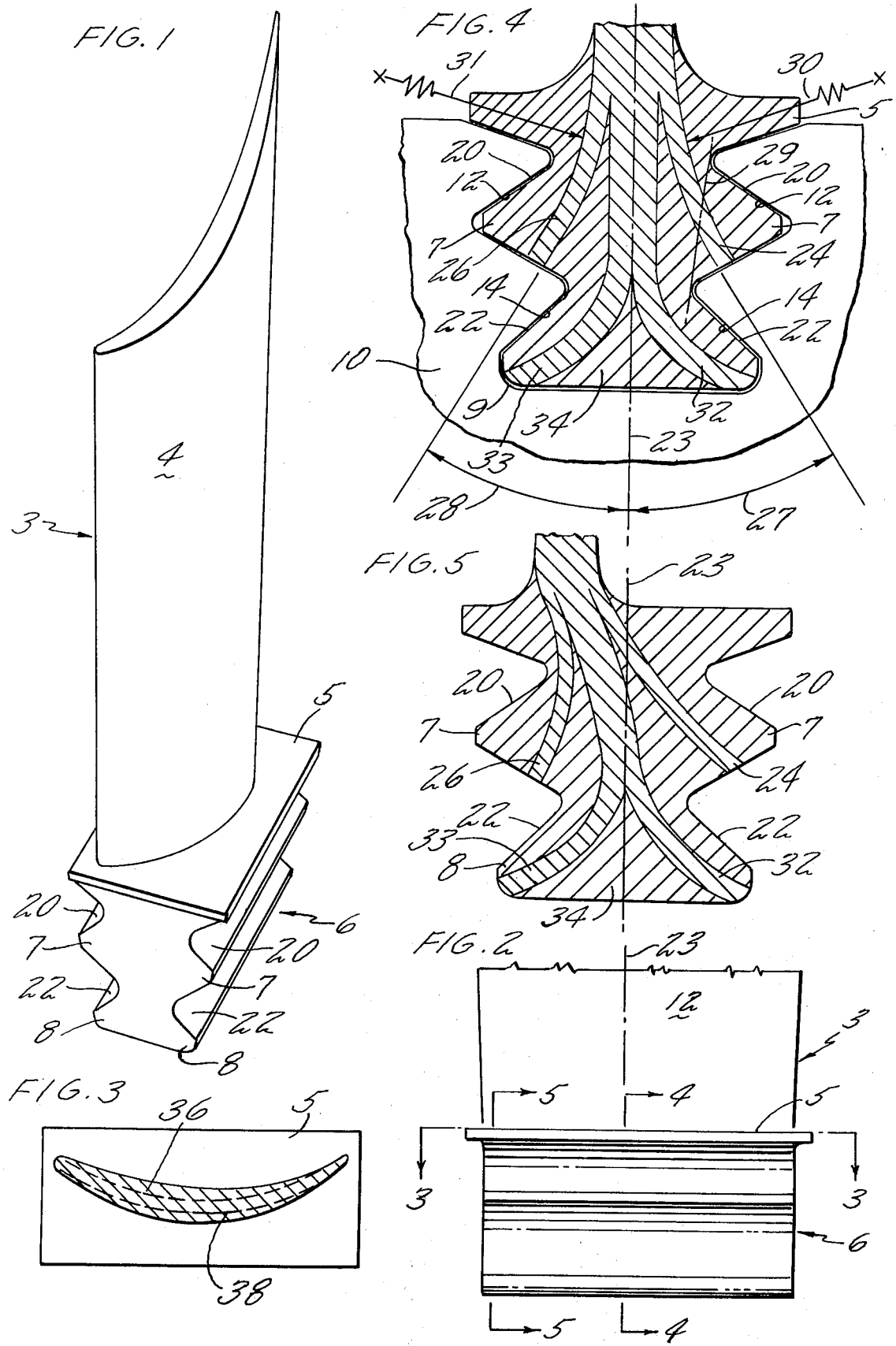

COMPOSITE BLADE ROOT CONFIGURATION

This invention was made pursuant to a contract with the Department of the Air Force.

BACKGROUND OF THE INVENTION

1. Field of the Invention

This invention relates to composite blades and more particularly to an improved construction for composite blades.

2. Description of the Prior Art

It is well known that the use of high strength filament reinforced composite materials have undergone considerable research and development in recent years for use in aircraft engines. The main reason for this research and development is the extremely high strength to weight ratio of these materials. A major difficulty with these materials is that their strength is essentially unidirectional, since the fibers are only extremely strong in tension. This unidirectional strength is, however, particularly suited to rotor blades, such as for fans, compressors, or turbines, wherein most of the forces are created by centrifugal loads and are radial. The high strength fibers in a composite blade are thus oriented in a substantially spanwise direction, running from the tip to the base of the blade, and thereupon into the root.

Generally, when one speaks of the unidirectional strength of composite materials it is not because the fibers in and of themself are particularly weak in shear. The difficulty lies in the fact that the matrix material is often weak in shear, thus being unable to prevent motion between the adjacent fibers, which could of course result in failure of the blade during operation. To remedy this weakness special steps often have to be taken to assure that the fibers are securely held within the root. Curving the ends of the fibers within the root is one technique which helps in this respect.

In a dovetail shaped root the shear stresses from operational loads are taken through tangs which protrude from each side of the root. These tangs are sometimes made from the matrix material used in the composite blade; for example, they may be aluminum in a blade made with boron fibers in an aluminum matrix. If this material is not in and of itself sufficiently strong to take the shear stresses through the tangs then it must either be reinforced in some manner or the streses must be reduced. One way to reduce shear stresses is the use of additional tangs to distribute the stresses over a larger cross-sectional area of material. For instance, an additional pair of tangs might be added to the root, and be situated, with respect to the disc, radially inward of the first set of tangs. A root of this configuration is known as a double dovetail. The second set of tangs is often slightly smaller than the first set of tangs, thus giving the root a somewhat tapered look. The well-known fir tree root, in a sense, extends the idea of using additional tangs to its logical conclusion.

A problem with roots of the above type and particularly with roots of the double dovetail configuration, is assuring that each of the several tangs takes its share of the shear stresses; the major difficulty is machining the tangs bearing surfaces and their mating disc bearing surfaces so that during rotor operation all mating bearing surfaces come into contact to properly distribute the shear loads. With respect to double dovetail roots that are made today, the radially outermost bearing surfaces often come into contact with the disc before the innermost bearing surfaces. The outer tangs are often inflexible due to the stiffening effect of fibers brought into the tangs, with the result that the outer tangs take a disproportionate amount of the shear load; however, if the tangs were not reinforced with fibers they might not withstand the shear loads. These problems might limit the choice of materials which could be satisfactorily used in the root, or might necessitate the use of a root which is oversized, in comparison to the root which might have been used had the stresses been more evenly distributed throughout the plurality of tangs.

SUMMARY OF THE INVENTION

An object of the present invention is an improved fiber reinforced composite blade construction for blades having a multiple tang root configuration.

A further object of the present invention is an improved fiber reinforced composite blade construction having a multiple tang root wherein, during operation, the blade loads are advantageously distributed between the tangs.

According to the present invention, in a composite blade, having an airfoil and root portion, the airfoil comprising spanwise fibers, and the root comprising a plurality of tangs, the fibers extend from the airfoil into the root and are arranged to control the relative flexibility of the tangs.

Fibers which enter a tang perpendicular to the direction of shear stress (that is, generally perpendicular to the longitudinal axis of the airfoil) provide the greatest increase in resistance to bending of the tang. Also, when the fiber material is stronger than the root material, the greater the volume of fibers within the tang, the greater will be the resistance of the tang to bending and yielding. The present invention utilizes these and other characteristics of fibers within a root to distribute stresses advantageously between the root tangs, as described more fully hereinafter.

In one embodiment of the present invention, the blade root is aluminum and of a double dovetail configuration, and the airfoil comprises boron fibers in an aluminum matrix. The root fits into a mating slot in the periphery of a disc. Fiber bundles are brought from the airfoil into the root and are curved into each of the four tangs of the double dovetail. The arrangement of fibers within each tang is as follows: first, the depth and angle of penetration of fibers into the radially outermost pair of tangs, that is, the pair of tangs nearest the airfoil, is relatively shallow so that these outer tangs retain some radial flexibility; this radial flexibility assures that the bearing surfaces of the radially innermost pair of tangs will move into load carrying contact with their corresponding disc bearing surfaces when the rotor is operational; second, fibers are curved sharply into the innermost pair of tangs, penetrating deeply into the tangs, the axes of the fibers being more closely perpendicualr to the direction of the shear stress than the fibers in the outer tangs; this results in the inner tangs being less flexible than the outer tangs to assure that the inner tangs remain in load carrying contact with the disc; and third, a relatively sharp radius of curvature for the fibers entering the innermost pair of tangs assures that the fibers in these tangs are held securely to prevent distortion of the matrix resulting in shifting between the fibers which could transfer the shear loads from the inner tangs back into the outer tangs.

BRIEF DESCRIPTION OF THE DRAWING

FIG. 1 is a perspective view of a compressor blade incorporating the present invention.

FIG. 2 is a partial side elevation view of the compressor blade shown in FIG. 1.

FIG. 3 is a sectional view of the blade of FIG. 2 taken along the line 3—3 in FIG. 2.

FIG. 4 is a sectional view of the root of the blade taken along the line 4—4 in FIG. 2.

FIG. 5 is a sectional view of the root of the blade taken along the line 5—5 in FIG. 2.

DESCRIPTION OF THE PREFERRED EMBODIMENT

As an example of a blade embodying features of the present invention, consider the blade 3 shown in FIG. 1. The blade is adapted for use in a gas turbine engine and comprises an airfoil 4, a platform 5 and a root 6. The root 6 includes a radially outer pair of tangs 7 and a radially inner pair of tangs 8; this configuration is known as a double dovetail root. The root 6 is adapted to mate with slots, such as a slot 9 as shown in FIG. 4, formed in the outer periphery of a disc 10 (FIG. 4). The slot 9 has an outer and inner set of bearing surfaces 12, 14, respectively. The double dovetail root has two sets of bearing surfaces, an outer set and an inner set 20, 22, respectively, which are adapted to mate with the outer and inner bearing surfaces 12, 14, respectively, of the slot 9.

The airfoil in this embodiment is comprised of high strength boron fibers in an aluminum matrix, the fibers being oriented in a substantially spanwise direction, which is generally substantially parallel to the longitudinal axis 23 (FIGS. 2, 4 and 5) of the air foil; however, the outer surface of the airfoil may include fibers which are angled with respect to the longitudinal axis to provide some added torsional stiffness to the airfoil. The root 6 in this embodiment is also aluminum, which is highly desirable from cost, ease of fabrication, and weight standpoints but which, in some applications, cannot be used due to its strength limitations. The double dovetail design helps alleviate this limitation by providing two pairs of tangs 7, 8 to take the shear loads. The fibers within the airfoil 4 are brought down into the root 6, divided into groups or bundles (24, 26, 32, 33) of fibers, and splayed into each of the four tangs (FIGS. 4 and 5) to provide additional shear strength to the tangs. Generally, without this reinforcement, the aluminum tangs would be unable to withstand the shear stresses imposed upon them, even with the double dovetail configuration of this preferred embodiment.

As hereinbefore discussed, the outer set of bearing surfaces 20 generally come into contact with their corresponding disc bearing surfaces 12 before the inner set of bearing surfaces 22 come into contact with their corresponding disc bearing surfaces 14. Often, only a small fraction of the total operational load is transferred into the inner pair of tangs 8. This drawback of the double dovetail configuration may be minimized or even eliminated if the outer set of tangs 7 are able to bend or yield slightly to assure that the inner bearing surfaces 22 come into load carrying contact with the disc bearing surfaces 14.

Referring to FIG. 4, the flexibility of the tangs, such as the outer tangs 7, is controlled by the manner in which fiber bundles 24, 26 are arranged within the tangs. The flexibility of the tangs will vary with the angles 27, 28 between the fiber bundles 24, 26 and the longitudinal axis 23. Fibers within the tang which are oriented perpendicular to the longitudinal axis 23 (i.e. an angle of 90°) would provide maximum bending stiffness to the tang. Thus, to assure that the tangs 7 are sufficiently flexible, the angles 27, 28 between the longitudinal axis 23 and the fiber bundles 24, 26, respectively, are kept relatively small. It is important, however, that the fiber bundles 24, 26 extend sufficiently far into the tangs 7 to provide some additional shear strength for the tangs; thus in FIG. 4, if a dashed line 29 represents the likely shear plane for the right-hand tang 7, the fiber bundle 24 should extend past this plane. Also, the relative volume of fibers to aluminum within the tang is a factor that affects the flexibility of the tang; the greater the volume ratio of fibers to nonfibers within a tang, the lesser the flexibility of the tang. For that reason the size and the depth of penetration of the fiber bundles within the tangs 7 should also be carefully chosen.

In this embodiment, the curvature of the fiber bundles is chosen to give the desired angle, volume ratio and depth of penetration of the fibers. A large radius of curvature such as at 30 and 31, results in a small angle at 27 and 28, a small volume ratio and only slight penetration of the fibers within the outer tangs 7.

For much the same reason that the outer tangs 17 should be somewhat flexible, the inner tangs 8 should be relatively rigid, for if the inner tangs are able to bend under the loads applied to their bearing surfaces 22 than the operational loads may shift, for the most part, back into the outer tangs 17. Thus, fiber bundles such as 32 and 33 are curved relatively sharply into the inner tangs 8. In this manner, not only are the fibers more closely perpendicular to the longitudinal axis 23, but the bundles extend further into the tang. This increases the volume ratio of fibers to aluminum within the tangs. Also, the relatively sharp curvature of the fibers within a bundle such as 32 or 33 minimizes shifting between adjacent fibers within the bundle, which, as hereinabove stated, prevents the shear loads from being transferred from the inner to the outer tangs. The smaller the curvature of the fiber bundle, the greater its ability to take shear between adjacent fibers. In this regard, a wedge portion 34 of the root 6, between the fiber bundles 32, 33 helps hold the fibers tightly within the inner tangs to further prevent shifting between adjacent fibers within the bundles. Finally, as was the case with the outer tangs 7, the fiber bundles must extend into the inner tangs at least enough so that the aluminum alone does not take the entire load in shear.

FIG. 3 is a cross section of the airfoil 4 taken at the platform 5. The dotted lines 36, 38 represent the manner in which the fibers within the airfoil are split between the outer and inner tangs 7, 8, respectively. Those fibers above the dotted line 36 are the fibers in the left-hand fiber bundle 26; those fibers below the dotted line 38 are the fibers within the right-hand fiber bundle 24 (FIG. 4); and those fibers between the dotted lines 36 and 38 are the fibers which extend into the inner tangs 8. In this embodiment, the latter fibers are split approximately equally between the right and left inner tangs.

It should be obvious from the foregoing that this invention need not be limited to use with a double dovetail root; nor need it be limited to blades using boron fibers in an aluminum matrix or blades having an aluminum root. Any root configuration having two or more tangs might find this invention advantageous for controlling the distribution of stresses within the tangs. It should be also clear that the manner in which the fibers within the airfoil are divided and distributed between the tangs is a matter of choice, and depends on a variety of factors. For example, if conditions permitted, the bundle of fibers between the dotted lines 36 and 38 in FIG. 3 might not have included fibers near the leading and trailing edges of the airfoil; that is, in some applications it may be desirable for fibers near the leading and trailing edges of the airfoil to be brought into the outer tangs 7 while only fibers within the central portion of the airfoil section are brought into the inner tangs 8. In this regard, the invention described in our commonly owned copending application, Serial No. (United Aircraft Corporation Docket No. EH–3409), filed on even date herewith, might well have usefulness in combination with the present invention.

Although the invention has been shown and described with respect to a preferred embodiment thereof, it should be understood by those skilled in the art that various changes and ommissions in the form and detail thereof may be made therein without departing from the spirit and the scope of the invention.

Having thus described typical embodiments of our invention, that which we claim as new and desire to secure by Letters Patent of the United States is:

1. A composite blade, having an airfoil and root, the root being adapted to fit within a slot on the periphery of a rotor, the slot including a radially inner bearing surface and radially outer bearing surface for taking blade operational loads, said root having a radially inner tang including a bearing surface adapted to mate with said inner bearing surface and a radially outer tang including a bearing surface adapted to mate with said outer bearing surface, the airfoil having a longitudinal axis and including fibers oriented in a substantially spanwise direction, said fibers extending from the airfoil into the root, the root including an arrangement of said fibers within the inner tang that is different from that of the arrangement within the outer tang, to control the flexibility of the radially inner tang relative to the flexibility of the radially outer tang to assure that said root bearing surfaces mate with the disc bearing surfaces.

2. A composite blade according to claim 1, wherein the arrangement of fibers within each of said tangs includes a greater volume ratio of fibers to nonfibers within the radially inner tang than within the radially outer tang to increase the flexibility of the outer tang with respect to the inner tang.

3. The composite blade according to claim 1, wherein said arrangement of fibers within each of said tangs includes fibers at an angle with respect to said longitudinal axis, said angle being greater within the inner tang than within the outer tang to increase the flexibility of the outer tang with respect to the inner tang.

4. The composite blade according to claim 1, wherein said arrangement of fibers within each of said tangs includes a greater depth of penetration of fibers within the inner tang than within the outer tang to increase the flexibility of the outer tang with respect to the inner tang.

5. The composite blade according to claim 2, wherein the arrangement of fibers within each of said tangs includes fibers at an angle with respect to said longitudinal axis, the angle of the fibers within the outer tang being less than the angle of the fibers within the inner tang to increase the flexibility of the outer tang with respect to the inner tang.

6. The composite blade according to claim 5, wherein the arrangement of fibers within each of said tangs includes a greater depth of penetration of fibers within the inner tang than within the outer tang to increase the flexibility of the outer tang with respect to the inner tang.

7. The composite blade according to claim 6, wherein said arrangement of fibers within each of said tangs includes a bundle of fibers curved into the radially inner tang and a bundle of fibers curved into the radially outer tang, the resulting angle of said bundle with respect to said longitudinal axis and the resulting depth of penetration of said fibers within each tang being greater within the inner tang than within the outer tang to increase the flexibility of the outer tang with respect to the inner tang.

8. The composite blade according to claim 7, wherein said root is of the double dovetail configuration.

* * * * *